(12) United States Patent
O

(10) Patent No.: US 10,183,618 B2
(45) Date of Patent: Jan. 22, 2019

(54) SYSTEM FOR COMMUNICATION BETWEEN INSIDE AND OUTSIDE OF VEHICLE

(71) Applicant: Jae Du O, Seoul (KR)

(72) Inventor: Jae Du O, Seoul (KR)

( * ) Notice: Subject to any disclaimer, the term of this patent is extended or adjusted under 35 U.S.C. 154(b) by 0 days.

(21) Appl. No.: 15/506,872

(22) PCT Filed: Apr. 6, 2016

(86) PCT No.: PCT/KR2016/003568
§ 371 (c)(1),
(2) Date: Feb. 27, 2017

(87) PCT Pub. No.: WO2017/115931
PCT Pub. Date: Jul. 6, 2017

(65) Prior Publication Data
US 2018/0105103 A1    Apr. 19, 2018

(30) Foreign Application Priority Data
Dec. 28, 2015  (KR) .................. 10-2015-0187303

(51) Int. Cl.
*B60Q 5/00*  (2006.01)
*B60R 11/00*  (2006.01)
*B60R 16/023*  (2006.01)
*G06F 3/16*  (2006.01)
*B60Q 1/52*  (2006.01)
(Continued)

(52) U.S. Cl.
CPC ............. *B60Q 5/006* (2013.01); *B60Q 1/525* (2013.01); *B60Q 9/008* (2013.01); *B60R 11/00* (2013.01); *B60R 16/023* (2013.01); *G06F 3/16* (2013.01); *H04R 27/00* (2013.01); *B60Q 5/001* (2013.01); *H04R 3/00* (2013.01); *H04R 2430/01* (2013.01);
(Continued)

(58) Field of Classification Search
USPC ......... 381/26, 71.2, 71.4, 92, 111, 302, 365, 381/389, 86
See application file for complete search history.

(56) References Cited

U.S. PATENT DOCUMENTS

| | | | |
|---|---|---|---|
| 2002/0001398 A1* | 1/2002 | Shimano | G06K 9/6293 382/104 |
| 2015/0161836 A1* | 6/2015 | Park | G07C 9/00134 340/5.51 |
| 2018/0034912 A1* | 2/2018 | Binder | H04L 67/12 |

FOREIGN PATENT DOCUMENTS

| | | |
|---|---|---|
| JP | 2009-035159 | 2/2009 |
| JP | 4438716 | 3/2010 |

(Continued)

*Primary Examiner* — Yosef K Laekemariam
(74) *Attorney, Agent, or Firm* — Lee & Associates, LLC

(57) ABSTRACT

There is provided a system for communication between the interior and exterior of the vehicle, the system including an approach sensor part, a wind ejection part, a light emitting part, a memory part, and a control part. The approach sensor part is installed on a part of a front side or a rear side or both lateral surfaces of the vehicle. The wind ejection part ejects the wind in the direction of the pedestrian or the target object in accordance with a detection result of the approach sensor part. The light emitting part emits a light in the direction of the pedestrian or the target object in accordance with the detection result of the approach sensor part. The memory part stores pattern information on the wind or the light by the wind ejection part or the light emitting part.

7 Claims, 5 Drawing Sheets

(51) Int. Cl.
*B60Q 9/00* (2006.01)
*H04R 27/00* (2006.01)
*H04R 3/00* (2006.01)

(52) U.S. Cl.
CPC ...... *H04R 2430/03* (2013.01); *H04R 2499/13* (2013.01)

(56) References Cited

FOREIGN PATENT DOCUMENTS

| KR | 20-2010-0007748 | 8/2010 |
| KR | 10-2012-0013652 | 2/2012 |

\* cited by examiner

SYSTEM FOR COMMUNICATION BETWEEN INSIDE AND OUTSIDE OF VEHICLE

CROSS-REFERENCE TO RELATED APPLICATIONS

This application is a national stage application of International Patent Application No. PCT/KR2016/003568 filed on Apr. 6, 2016, which claims priority to Korean Patent Application No. 10-2015-0187303 filed on Dec. 28, 2015, the entire contents of which are incorporated by reference herein.

TECHNICAL FIELD

The embodiment of the present invention relates to a system for communication between inside and outside of a vehicle.

BACKGROUND

Generally, a user in a vehicle has no choice but to open a window, a front door or a rear door of the vehicle to converse with a person outside the vehicle while an air conditioner or a heater inside the vehicle is turned on in hot summer or cold winter.

That is, if an air conditioner is turned on in hot summer or a heater is operating in cold winter and windows and doors of the vehicle are closed, sounds of the vehicle are not transferred to the inside or outside of the vehicle, and a driver or a passenger, therefore, should open a window or a door inevitably to converse with a person outside the vehicle.

In a conventional vehicle like this, since a driver or a passenger should open a window or a door every time to converse with a person outside the vehicle from the inside, cold or warm air in the vehicle is discharged to the outside in summer or cold winter, and thus fuel consumption is increased, and in addition, it is inconvenient in that a window or a door should be opened frequently whenever the driver or the passenger converses with a person outside the vehicle.

In addition, a surround warning device used in a conventional vehicle has a problem in that since it transfers a warning signal to a driver or a pedestrian in the vicinity using a lamp or a sound, a hearing-impaired person may not hear the sound, and collision accidents frequently occur due to the reason.

SUMMARY OF THE DISCLOSURE

An embodiment of the present invention provides a system for communication between inside and outside of a vehicle, which can provide a hearing-impaired person or a pedestrian located in front of the vehicle with wind as a signal for alerting approach of the vehicle.

In addition, an embodiment of the present invention provides a system for communication between inside and outside of a vehicle, so that a person inside the vehicle may communicate with a person outside the vehicle without opening a window of the vehicle.

A system for communication between inside and outside of a vehicle according to an embodiment of the present invention may include: a proximity sensor unit for sensing a pedestrian or a target object located within a predetermined distance, as a part installed on a front side or a rear side of the vehicle or a device installed on both lateral sides of the vehicle; a wind blowing unit for blowing a strong wind in a direction of the pedestrian or the target object according to a sensing result of the proximity sensor unit; a light emitting unit for emitting light in the direction of the pedestrian or the target object according to the sensing result of the proximity sensor unit; a memory unit for storing information on a pattern of the wind or the light generated by the wind blowing unit or the light emitting unit; and a control unit for controlling operation of the proximity sensor unit, the wind blowing unit, the light emitting unit and the memory unit to extract information on the pattern of the wind or the light and blow or output the wind or the light according to a distance to the pedestrian or the target object.

The system for communication between inside and outside of a vehicle according to an embodiment of the present invention may further include: a switch unit installed in a vicinity of a steering wheel inside the vehicle and automatically or manually turned on and off; a first voice transmission unit installed inside the vehicle to sense a voice signal having an amplitude of a first level or higher from the inside of the vehicle and transmit the voice signal to the second voice transmission unit by turn-on operation of the switch unit; and a second voice transmission unit installed outside the vehicle to sense a voice signal having an amplitude of a second level or higher, which is higher than the first level, from the outside of the vehicle and transmit the voice signal to the first voice transmission unit by turn-on operation of the switch unit.

The control unit may automatically turn on the switch unit according to the sensing result of the proximity sensor unit.

The first voice transmission unit may include: a first microphone for receiving the voice signal of the inside of the vehicle; a first amplitude measurement unit for measuring amplitude of the voice signal input into the first microphone; a first filtering unit for passing a frequency of a specific band among a corresponding voice signal when the amplitude of the voice signal input into the first microphone is equal to a first level or higher as a result of the measurement of the first amplitude measurement unit; a first amplification unit for amplifying the voice signal passing through the first filtering unit; and a first signal transmission unit for transmitting the voice signal amplified by the first amplification unit to the second voice transmission unit.

The second voice transmission unit may include: a second microphone for receiving a voice signal of the outside of the vehicle; a second amplitude measurement unit for measuring amplitude of the voice signal input into the second microphone; a second filtering unit for passing a frequency of a specific band among a corresponding voice signal when the amplitude of the voice signal input into the second microphone is equal to a second level or higher as a result of the measurement of the second amplitude measurement unit; a second amplification unit for amplifying the voice signal passing through the second filtering unit; and a second signal transmission unit for transmitting the voice signal amplified by the second amplification unit to the first voice transmission unit.

The frequency of a specific band may be a frequency in a frequency band of a voice of a human being.

Since the system for communication between inside and outside of a vehicle according an embodiment of the present invention provides a hearing-impaired person or a pedestrian located in front of the vehicle with wind as a signal for alerting approach of the vehicle, safety accidents of the hearing-impaired person who cannot hear a sound or the pedestrian moving with an earphone on the ears can be prevented in advance.

Furthermore, since the embodiment of the present invention allows communication between inside and outside of a vehicle without opening a window of the vehicle, the inconvenience of opening a window to communicate with a person outside the vehicle can be relieved in a situation of conversing with the person outside the vehicle while an air conditioner is turned on inside the vehicle in hot summer or while windows are closed in cold winter, in case of raining or snowing, or in a case where occurrence of a crime is worried.

DETAILED DESCRIPTION OF PREFERRED EMBODIMENTS

Figure 1:
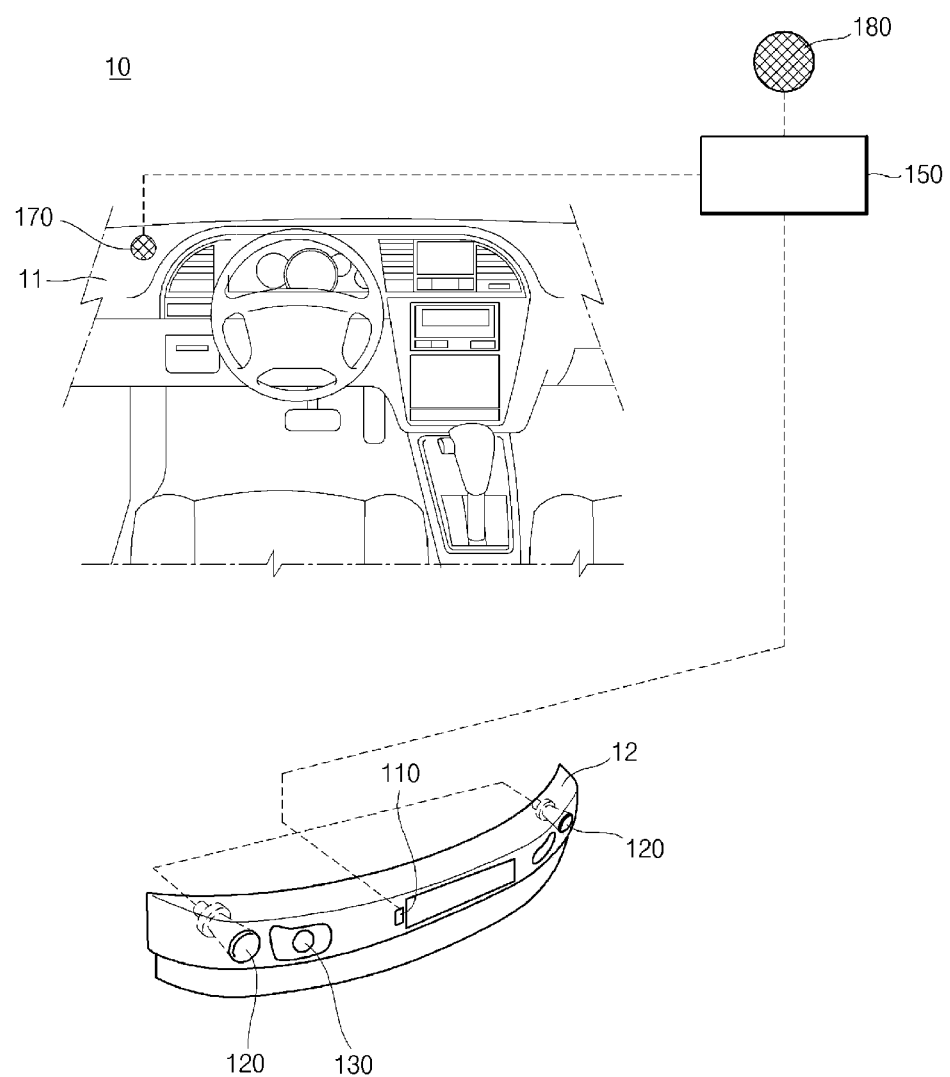
FIG. 1 is a view showing a system for communication between inside and outside of a vehicle according an embodiment of the present invention.

The terms used in this specification will be described briefly first, and the present invention will be described in detail.

Although general terms widely used in the present are selected in the present invention in consideration of the functions of the present invention, this may vary according to the intention of those skilled in the art, legal precedents, advent of new technologies or the like. In addition, in some special cases, terms arbitrarily selected by the inventor may be included, and in this case, detailed meaning of the terms will be disclosed in the description of the present invention. Accordingly, the terms used in the present invention should be defined based on the meaning that a term possesses and the content described throughout the present invention.

Throughout the specification, when a component "includes" another component, it means that the component may further include another component, not excluding another component as far as an opposed description is not specially specified. In addition, the terms such as "unit" and the like disclosed in the specification indicate a unit for performing at least one function or operation and may be implemented by hardware, software or a combination hardware and software.

Hereinafter, an embodiment of the present invention will be described in detail with reference to the accompanying drawings so that those skilled in the art may easily embody the present invention. However, the present invention may be implemented in various different forms and is not limited to the embodiment described herein. In addition, parts unrelated to the description are omitted to clearly describe the present invention, and elements having like functions will be denoted by like reference numerals throughout the specification.

Figure 2:
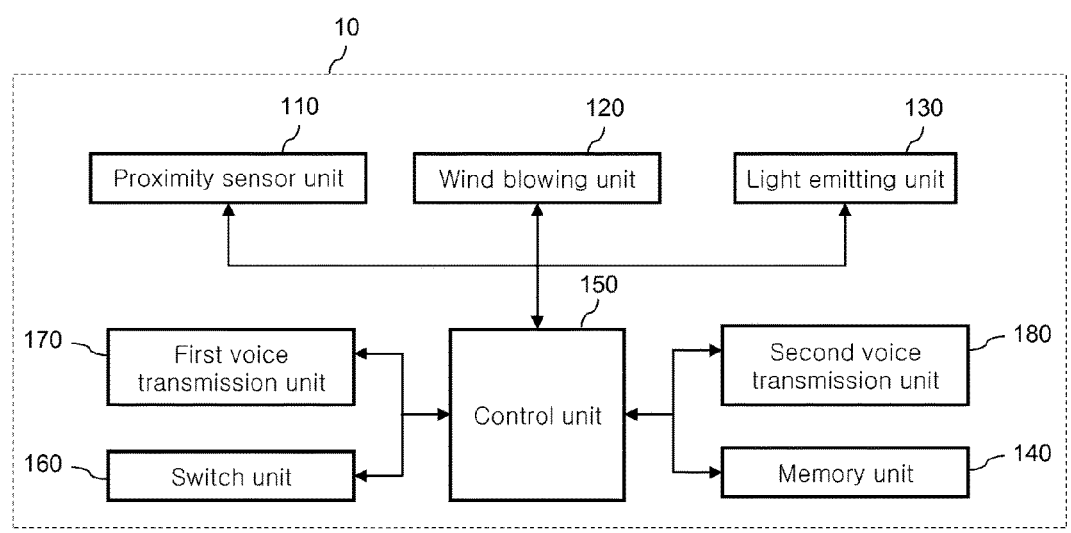
FIG. 2 is a block diagram schematically showing a system for communication between inside and outside of a vehicle according an embodiment of the present invention.
Figure 3:
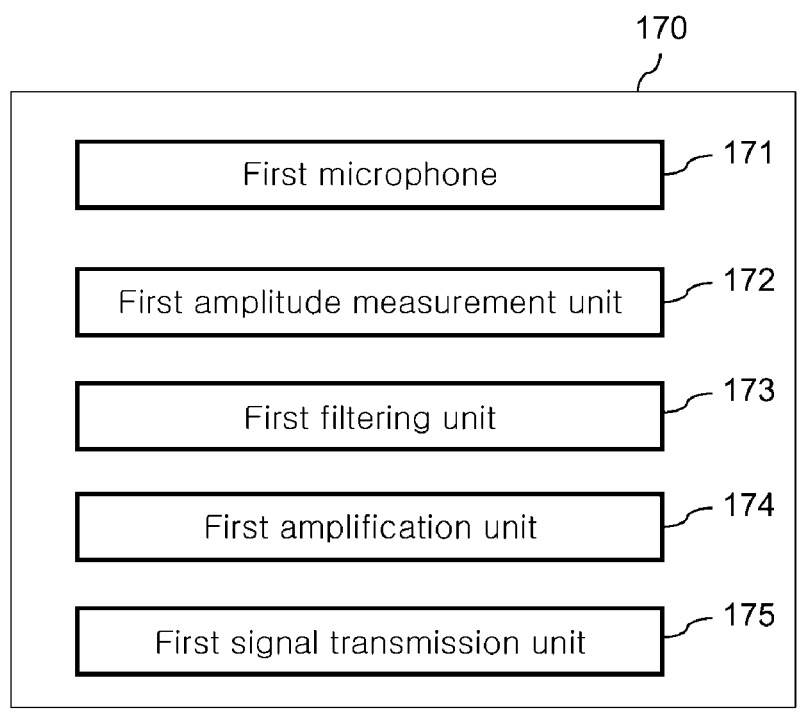
FIG. 3 is a block diagram schematically showing a first voice transmission unit of FIG. 2.
Figure 4:
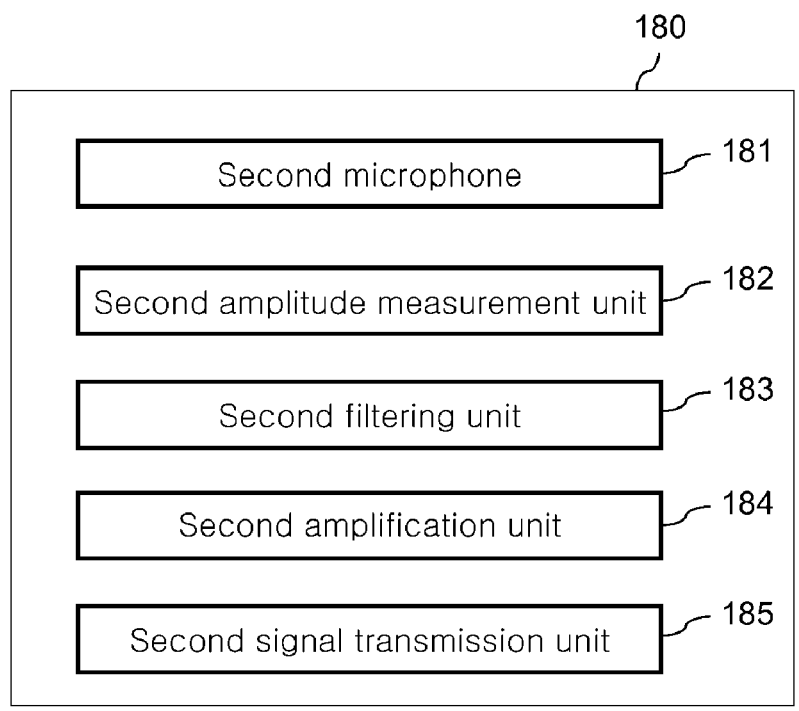
FIG. 4 is a block diagram schematically showing a second voice transmission unit of FIG. 2.
Figure 5:
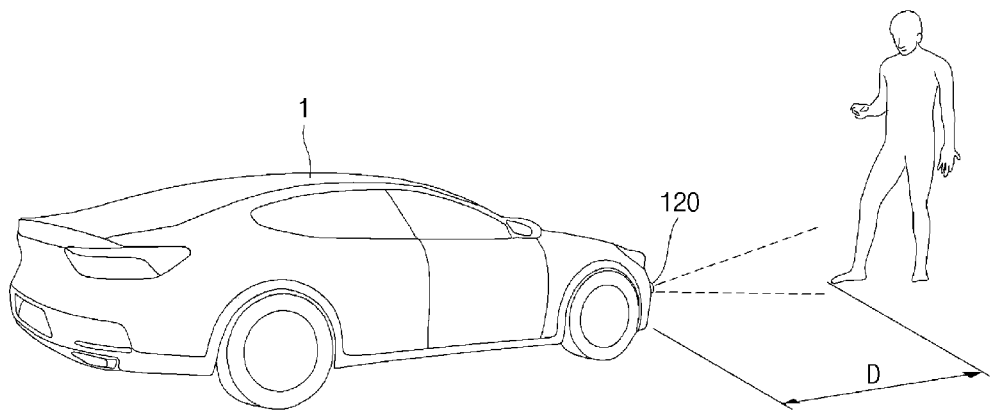
FIG. 5 is a view showing an example of implementing a system for communication between inside and outside of a vehicle according an embodiment of the present invention.

FIG. 1 is a view showing a system for communication between inside and outside of a vehicle according an embodiment of the present invention, FIG. 2 is a block diagram schematically showing a system for communication between inside and outside of a vehicle according an embodiment of the present invention, FIG. 3 is a block diagram schematically showing a first voice transmission unit of FIG. 2, FIG. 4 is a block diagram schematically showing a second voice transmission unit of FIG. 2, and FIG. 5 is a view showing an example of implementing a system for communication between inside and outside of a vehicle according an embodiment of the present invention.

Referring to FIGS. 1 and 2, the system for communication between inside and outside of a vehicle according an embodiment of the present invention is a system for providing a hearing-impaired person or a pedestrian located in front of the vehicle 1 with wind as a signal for alerting approach of the vehicle and includes a proximity sensor unit 110, a wind blowing unit 120, a light emitting unit 130, a memory unit 140, a switch unit 160, a first voice transmission unit 170, a second voice transmission unit 180 and a control unit 150.

Meanwhile, a pedestrian or a target object in the present invention is a concept including all of a hearing-impaired person who cannot a hear sound, a person wearing an earphone or a headphone on the ears or head and difficult to hear a sound and the like, as well as a general pedestrian walking on a street.

The proximity sensor unit 110 is a part installed on the front side or the rear side of the vehicle 1 or a device installed on both lateral sides of the vehicle to sense a pedestrian or a target object located within a predetermined distance. Such a proximity sensor unit 110 includes at least one proximity sensor to senses approach of a pedestrian or a target object with respect to a specific location. Such a proximity sensor extracts proximity parameters from distortion of an electric field according to movement of the pedestrian or the target object in a free space where a quasi-static electric field is formed and creates proximity information on the basis of the proximity parameters.

The wind blowing unit 120 is a device for blowing a strong wind in the direction of the pedestrian or the target object according to a sensing result of the proximity sensor unit 110 as shown in FIG. 5. That is, if it is sensed by the proximity sensor unit 110 that a pedestrian or a target object approaches within a predetermined distance, the wind blowing unit 120 blows out a strong wind of a predetermined strength in the direction of a corresponding pedestrian or target object. To this end, the wind blowing unit 120 is connected to a discharge means (not shown) for discharging air to the outside.

The light emitting unit 130 is a device for emitting light in the direction of the pedestrian or the target object according to a sensing result of the proximity sensor unit 110. That is, if it is sensed by the proximity sensor unit 110 that the pedestrian or the target object approaches within a predetermined distance, the light emitting unit 130 emits light of a predetermined brightness in the direction of a corresponding pedestrian or target object.

The memory unit 140 is a device for storing information on the pattern of the wind or the light generated by the wind blowing unit 120 or the light emitting unit 130, and it classifies strength of wind or light according to the pattern and stores information on the pattern of the wind or the light corresponding thereto. Such a memory unit 140 may include at least one type of storage medium among a flash memory type, a hard disk type, a multimedia card micro type, a card type memory (e.g., SD or XD memory or the like), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk and an optical disk.

The switch unit 160 is a device installed in the vicinity of a steering wheel inside the vehicle 1 and automatically or manually turned on and off. Such a switch unit 160 may be provided in the form of a button that can be handled by a driver or in a form in which an automatically switched electronic element is installed on a printed circuit board.

The first voice transmission unit 170 is a device installed inside the vehicle 1 (e.g., installed on an instrument panel 11) to sense a voice signal having an amplitude of a first level or higher from the inside of the vehicle 1 and transmit the voice signal to the second voice transmission unit 180 by turn-on operation of the switch unit 160.

More specifically, as shown in FIG. 3, the first voice transmission unit 170 may include: a first microphone 171 for receiving a voice signal of the inside of the vehicle 1; a first amplitude measurement unit 172 for measuring amplitude of the voice signal input into the first microphone 171; a first filtering unit 173 for passing a frequency of a specific band among a corresponding voice signal when the amplitude of the voice signal input into the first microphone 171 is equal to a first level or higher as a result of the measurement of the first amplitude measurement unit 172; a first amplification unit 174 for amplifying the voice signal passing through the first filtering unit 173; and a first signal transmission unit 175 for transmitting the voice signal amplified by the first amplification unit 174 to the second voice transmission unit 180. At this point, the frequency of a specific band passed by the first filtering unit 173 may be a frequency in a frequency band of a voice of a human being. The first filtering unit 173 may include a band pass filter (BPF) for passing a frequency of a specific band. Meanwhile, the first voice transmission unit 170 may further include a speaker for outputting a voice signal transmitted from the second voice transmission unit 180.

The second voice transmission unit 180 is a device installed outside (e.g., installed on the outside of a driver side window, a front door, a rear door or a window) the vehicle 1 to sense a voice signal having an amplitude of a second level or higher, which is higher than the first level, from the outside of the vehicle 1 and transmit the voice signal to the first voice transmission unit 170 by turn-on operation of the switch unit 160. At this point, the voice signal of the outside of the vehicle 1 includes unintended surrounding noises and the like, as well as voices of persons in the vicinity. Accordingly, the present invention may improve accuracy of a voice signal by passing the voice signal through a band pass filter which passes only a frequency corresponding to voices of persons in the vicinity.

More specifically, as shown in FIG. 4, the second voice transmission unit 180 may include: a second microphone 181 for receiving a voice signal of the outside of the vehicle 1; a second amplitude measurement unit 182 for measuring amplitude of the voice signal input into the second microphone 181; a second filtering unit 183 for passing a frequency of a specific band among a corresponding voice signal when the amplitude of the voice signal input into the second microphone 181 is equal to a second level or higher as a result of the measurement of the second amplitude measurement unit 182; a second amplification unit 184 for amplifying the voice signal passing through the second filtering unit 183; and a second signal transmission unit 185 for transmitting the voice signal amplified by the second amplification unit 184 to the first voice transmission unit 170. At this point, the frequency of a specific band passed by the second filtering unit 183 may be a frequency in a frequency band of a voice of a human being. The second filtering unit 183 may include a band pass filter (BPF) for passing a frequency of a specific band. Meanwhile, the second voice transmission unit 180 may further include a speaker for outputting the voice signal transmitted from the first voice transmission unit 170.

The control unit 150 is a device for controlling operation of the proximity sensor unit 110, the wind blowing unit 120, the light emitting unit 130, the memory unit 140, the switch unit 160, the first voice transmission unit 170 and the second voice transmission unit 180 to extract information on the pattern of the wind or the light and blow or output the wind or the light according to the distance to a pedestrian or a target object. In addition, the control unit 150 may automatically turn on the switch unit 160 according to a sensing result of the proximity sensor unit 110.

The present invention may be applied to a system in which a driver indirectly expresses his or her state to persons in the vicinity. Particularly, the present invention may be applied to a honking system in which a driver positioned inside a vehicle 1 separated from the outside may indirectly express his or her psychological state to the outside.

Since the system for communication between inside and outside of a vehicle according an embodiment of the present invention configured as described above provides a hearing-impaired person or a pedestrian located in front of the vehicle with wind as a signal for alerting approach of the vehicle, safety accidents of the hearing-impaired person who cannot hear a sound or the pedestrian moving with an earphone on the ears can be prevented in advance. Furthermore, since the embodiment of the present invention allows communication between inside and outside of a vehicle without opening a window of the vehicle, the inconvenience of opening a window to communicate with a person outside the vehicle can be relieved in a situation of conversing with the person outside the vehicle while an air conditioner is turned on inside the vehicle in hot summer or while windows are closed in cold winter, in case of raining or snowing, or in a case where occurrence of a crime is worried.

Furthermore, in response to a situation in which elderly people or children may not recognize movement of a vehicle since noises such as an engine sound of a vehicle or the like are remarkably reduced recently in the case of electric vehicles, the system for communication between inside and outside of a vehicle according an embodiment of the present invention may be compulsorily mounted on a low-noise vehicle in the future to efficiently prevent safety accidents in advance.

While the above description is merely an embodiment for implementing a system for communication between inside and outside of a vehicle according the present invention, it is not to be restricted by the embodiment, but only by the appended claims. It is to be appreciated that those skilled in the art can change or modify the embodiment without departing from the scope and spirit of the present invention.

What is claimed is:
1. A system for communication between inside and outside of a vehicle, the system comprising:
a proximity sensor unit sensing a pedestrian or a target object located outside a vehicle, as a part installed on a front side or a rear side of the vehicle or as a device installed on lateral sides of the vehicle;

a wind blowing unit blowing a strong wind in a direction of the pedestrian or the target object located outside a vehicle according to a sensing result of the proximity sensor unit, the wind blowing unit installed on an outer surface of a vehicle body including a front side, a rear side, or lateral sides of the vehicle;

a light emitting unit emitting light in the direction of the pedestrian or the target object located outside a vehicle according to the sensing result of the proximity sensor unit, the light emitting unit installed on an outer surface of a vehicle including a front side, a rear side, or lateral sides of the vehicle;

a memory unit storing information on a pattern of wind or light generated by the wind blowing unit or the light emitting unit;

a control unit controlling operation of the proximity sensor unit, the wind blowing unit, the light emitting unit and the memory unit, extracting information on the pattern of wind or light, and outputting wind or light according to a distance to the pedestrian or the target object;

a switch unit installed in a vicinity of a steering wheel inside the vehicle and automatically or manually turned on and off;

a first voice transmission unit installed inside the vehicle to sense a voice signal having an amplitude of a first level or higher from the inside of the vehicle and transmit the voice signal to the second voice transmission unit by turn-on operation of the switch unit; and a second voice transmission unit installed outside the vehicle to sense a voice signal having an amplitude of a second level or higher, which is higher than the first level, from the outside of the vehicle and transmit the voice signal to the first voice transmission unit by turn-on operation of the switch unit, wherein the control unit automatically turns on the switch unit according to the sensing result of the proximity sensor unit, and wherein when the switch unit is turned on, the first voice transmission unit and the second voice transmission unit perform communication between the inside and outside of a vehicle.

2. The system according to claim 1, wherein the first voice transmission unit includes:

a first microphone for receiving the voice signal of the inside of the vehicle;

a first amplitude measurement unit for measuring amplitude of the voice signal input into the first microphone;

a first filtering unit for passing a frequency of a specific band among a corresponding voice signal when the amplitude of the voice signal input into the first microphone is equal to a first level or higher as a result of the measurement of the first amplitude measurement unit;

a first amplification unit for amplifying the voice signal passing through the first filtering unit; and a first signal transmission unit for transmitting the voice signal amplified by the first amplification unit to the second voice transmission unit.

3. The system according to claim 1, wherein the second voice transmission unit includes:

a second microphone for receiving a voice signal of the outside of the vehicle;

a second amplitude measurement unit for measuring amplitude of the voice signal input into the second microphone;

a second filtering unit for passing a frequency of a specific band among a corresponding voice signal when the amplitude of the voice signal input into the second microphone is equal to a second level or higher as a result of the measurement of the second amplitude measurement unit;

a second amplification unit for amplifying the voice signal passing through the second filtering unit; and a second signal transmission unit for transmitting the voice signal amplified by the second amplification unit to the first voice transmission unit.

4. The system according to claim 2, wherein the frequency of a specific band is a frequency in a frequency band of a voice of a human being.

5. The system according to claim 3, wherein the frequency of a specific band is a frequency in a frequency band of a voice of a human being.

6. The system according to claim 2, wherein the first voice transmission unit further includes a speaker to output a voice signal transmitted from the second voice transmission unit.

7. The system according to claim 3, wherein the second voice transmission unit further includes a speaker to output a voice signal transmitted from the first voice transmission unit.

* * * * *